(12) United States Patent
Nath

(10) Patent No.: US 6,314,227 B1
(45) Date of Patent: Nov. 6, 2001

(54) COATING MATERIALS FOR LIQUID LIGHTGUIDES

(76) Inventor: Günther Nath, Steinerstrasse 15, D-81369 Munich (DE)

( * ) Notice: Subject to any disclaimer, the term of this patent is extended or adjusted under 35 U.S.C. 154(b) by 0 days.

(21) Appl. No.: 09/423,721

(22) PCT Filed: Feb. 25, 1998

(86) PCT No.: PCT/EP98/01054

§ 371 Date: Nov. 12, 1999

§ 102(e) Date: Nov. 12, 1999

(87) PCT Pub. No.: WO98/38538

PCT Pub. Date: Sep. 3, 1998

(30) Foreign Application Priority Data

Feb. 28, 1997 (DE) ............................................. 197 08 295

(51) Int. Cl.⁷ ................................................. G02B 6/20
(52) U.S. Cl. ........................ 385/125; 385/123; 385/142; 385/144
(58) Field of Search ................................... 385/123, 125, 385/142, 144, 145

(56) References Cited

U.S. PATENT DOCUMENTS

| | | |
|---|---|---|
| 4,720,166 * | 1/1988 | Ohmori et al. .................... 385/145 |
| 5,155,796 * | 10/1992 | Oonishi et al. .................... 385/143 |
| 5,165,773 | 11/1992 | Nath . |
| 5,267,341 * | 11/1993 | Shearin .............................. 385/125 |
| 5,412,750 * | 5/1995 | Nath .................................. 385/125 |
| 5,675,689 * | 10/1997 | Nath .................................. 385/125 |
| 5,857,052 * | 6/1999 | Nath .................................. 385/125 |

FOREIGN PATENT DOCUMENTS

| | | |
|---|---|---|
| 38 12 473 | 11/1989 | (DE) . |
| 42 33 087 | 4/1994 | (DE) . |
| 195 08 752 | 9/1996 | (DE) . |
| 0 246 552 | 11/1987 | (EP) . |
| 95/12138 | 5/1995 | (WO) . |

* cited by examiner

Primary Examiner—Rodney Bovernick
Assistant Examiner—Sung Pak
(74) Attorney, Agent, or Firm—Venable; Robert Kinberg

(57) ABSTRACT

A liquid lightguide comprising a tube made out of a fluoropolymer, covered on the inside by a thin amorphous coating layer and closed at both ends by transparent plugs to contain within an optically transparent liquid. This liquid can be an aqueous solution of inorganic salts. The coating layer comprises a solid fluoropolymer, like TEFLON® AF, preferably a mixture of a solid fluoropolymer and a liquid fluoropolymer like a perfluoropolyether. This mixture is more economical and promotes a better adhesion of the layer to the tube, and allows for increased flexibility of the tube and smaller tube diameters. The hydrophobic properties of the mixture in contact with the aqueous solution preserves the coating layer composition and thus its optical properties, thus increasing the lifetime of the lightguide.

12 Claims, 1 Drawing Sheet

COATING MATERIALS FOR LIQUID LIGHTGUIDES

BACKGROUND OF THE INVENTION

1. Field of the Invention

Figure 1:
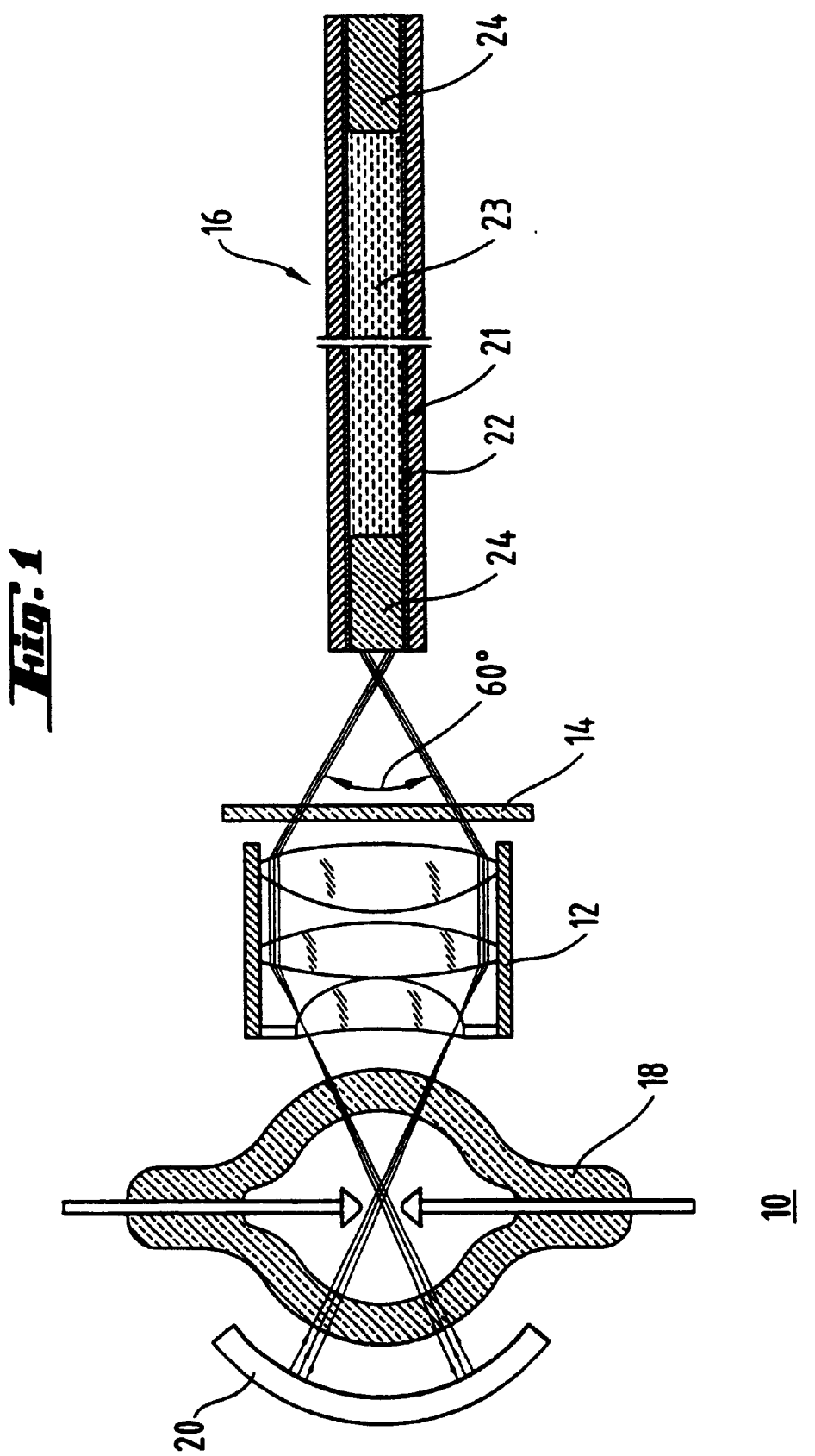

The present invention generally relates to the design of liquid lightguides, e.g. for use in medical endoscopy and in the curing of epoxy in dentistry and in industry, and more specifically to the selection of materials for tube, interior coating layer and for the transparent liquid.

2. Description of the Prior Art

Liquid lightguides with internal coating layers are already known since 1988.

In EP 0246 552 Fitz describes the possibility of coating internally flexible tubes made from thermoplastic or elastomeric material with an internally reflecting layer, made out of an amorphous fluoropolymer, called HOSTAFLON® TFB (Hoechst) or THV (3M Company), for use as a cladding of liquid core lightguides. The "highly amorphous" THV material from 3M can be dissolved in certain liquids, which allows for a simple coating process from solution by the way of dip coating.

In DE 423 3087 the present applicant describes a liquid core lightguide consisting of a tube made form a carbon fluoropolymer material, coated internally with a thin layer of TEFLON® AF, which is a new amorphous fluoropolymer, developed by the DuPont Company, comprising a copolymer of 2,2-bistrifluoromethyl-4,5-difluoro-1,3-dioxole (PDD) with tetrafluoroethylene (TFE).

Like THV from 3M, TEFLON® AF is also soluble in certain fluorinated liquids, thus allowing for a simple coating procedure via dip coating.

The advantages of internally coating plastic tubes, used for liquid lightguides with amorphous fluoropolymers are: Improved transmission due to the lack of crystallinity inside the reflective layer, and, especially when using TEFLON® AF, a higher numerical aperture of the lightguide, due to the extreme low value of the refractive index of TEFLON® AF, and as a consequence of the increased aperture, less dependence of the transmission on the bending radius of the tube.

The internal coating of tubes with TEFLON® AF, however, has also some disadvantages: DuPont, being the sole producer of TEFLON ® AF, charges 10 US$ per gram of the material. This means already considerable cost per meter of liquid lightguide, even with the small thickness of the applied layers being in the range of a few microns.

Furthermore, the adhesion of thin layers of TEFLON® AF applied from solution to the surface of plastic materials other than fluorocarbon polymers is still insufficient.

Especially the baking procedure at temperatures up to 250° C., required by DuPont to achieve good adhesion to the plastic surface, does not leave much of a choice for others than fluorocarbon polymers as a substrate material, being one of the few plastic materials, that can be heated up to such high temperatures.

The adhesion of TEFLON® AF to substrate materials of glass is also insufficient.

SUMMARY OF THE INVENTION

It is an object of the present invention to provide a more economical method to make an internal coating layer for a liquid lightguide tube without sacrificing the excellent optical properties of proven materials like TEFLON® AF. Another objective is to improve the adhesion of the coating layer resulting in a prolonged lifetime of the liquid lightguide, especially where frequent flexing is required, e.g. in medical endoscopy.

Briefly, the preferred embodiment of the present invention includes a illumination system comprising a high power lightsource with a reflecting mirror, a condensor lens and a filter which generates a cone of light of a selected wavelength, from the ultraviolet to the infrared, for acceptance by the aperture of a liquid lightguide. This lightguide comprises a tube, e.g. made out of a plastic like a fluoropolymer, which carries on its inside a thin amorphous coating layer, preferably also made out of at least one fluoropolymer. The tube is closed at both ends with transparent plugs to confine an optically transparent liquid within.

If the coating layer is at least a few wavelengths thick, say 3–20$\mu$, and if its index of refraction is lower than that of the transparent liquid within the tube, the liquid lightguide acts as a low loss optical waveguide. Besides for medical endoscopic applications, the liquid lightguide may be used for example for the transmission of high power ultraviolet light (up to several watts) for curing epoxy at a distance of several meters from the lightsource or for curing fillings in dentistry.

The invention is the result of a large number of experiments with different materials for tube, coating layer and transparent liquids. One specific aspect of the invention is to propose a mixture of solid (TEFLON® AF) amorphous fluoropolymers and liquid amorphous fluoropolymers (e.g. perfluorinated liquids like perfluoropolyether, PFPE) and to create thus a coating layer with the equivalent performance of one amorphous solid fluoropolymer (TEFLON® AF) for a much smaller cost. This mixture advantageously provides a better adhesion of the coating layer to the tube while yielding the same optical properties as pure TEFLON® AF. The nonpolar hydrophobic nature of the perfluorinated liquids together with their low surface energy of 15–20 dyn/cm contrasts favorably with the high surface energy of the aqueous, inorganic solutions, used as the transparent liquid which are frequently employed for their high transmissivity in the ultraviolet region, e.g. for curing epoxy. This hydrophobic nature of the perfluorinated liquids cause them to remain within the mixture of the coating layer inspite of frequent bending of the tube e.g. in endoscopic applications. These properties features extend the lightguide lifetime especially for larger diameter tubing, a highly desirable feature for industrial application.

An advantage of the present invention is the substitution of expensive TEFLON® AF with a mixture of TEFLON® AF and much less expensive perfluorinated liquids like PFPE as the coating layer while achieving the same index of refraction, thus achieving substantially lower material costs.

Another advantage of the present invention is the enhanced elasticity and enhanced adhesion of the mixture to the tube, resulting in a longer lifetime for the coating layer and thus the lightguide inspite of frequent bending.

Another advantage of the present invention is the hydrophobic nature of the perfluorinated liquids, like PFPE, within the coating layer, which prevents them from being diluted into the aqueous transparent liquid within the tube inspite of frequent bending, thus maintaining the reflective properties of the coating layer over a longer time.

Another advantage of the present invention is the possibility to use, besides TEFLON® AF, also another solid amorphous fluoropolymer, like TEFLON® SF Soluble Fluoropolymer (TEFLON® TE-5169A) as additive component for the production of the reflective layer.

IN THE DRAWINGS

FIG. 1 is a cross-sectional overview of the illuminating system.

DESCRIPTION OF THE PREFERRED EMBODIMENTS

An illuminating system 10 incorporating the present invention is shown in FIG. 1. It includes a discharge lamp 18, a mirror 20, a condensor 12, an optical filter 14 and a lightguide 16. The lightguide 16 comprises a tube 21 made out of a fluoropolymer plastic which carries internally a thin coating layer 22 of an amorphous fluoropolymer and filled with an optically transparent liquid 23, which is contained within tube 21 at both ends by cylindrical transparent plugs 24 made out of a glass or quartz glass. This system, tube, coating layer and transparent liquid, works as a lightguide if the refractive index of the transparent liquid 23 is larger than the refractive index of the coating layer 22. If light enters the lightguide below a critical angel, the maximum aperture angle, determined by the two refractive indices of the transparent liquid and the coating layer, it is propagated along the axis of the tube 21 by the mechanism of total reflection.

Tube 21, which provides mechanical, thermal and chemical stability, is preferably made out of fluoropolymer plastics like TEFLON® FEP, TEFLON® PFA, TEFLON® PTFE, TEFLON®ETFE (all made by DuPont), and PCTFE and THV (all made by 3 M) and HYFLON® MFA (made by Ausimont). Among these materials the perfluorinated ones, like FEP, PFA, PTFE and MFA are the most preferred ones. Among these materials MFA in its modification 620 is interesting due to its flexibility which is 15% better than that of FEP.

The perfluorinated polymer HYFLON® MFA, a new tube material from Ausimont, is a copolymer of TFE (tetrafluoroethylene) and PFMV (perfluoromethylvinylether) which matches well with a coating layer of preferably 3–6μ thickness of TEFLON® AF to practically equal the optical properties of the tube material TEFLON® AF. Its attractiveness over TEFLON® FEP are higher thermal stability, a higher resistivity against crack formation under stress and a higher flexibility, a feature especially important in medical endoscopy and the curing of dental epoxies. HYFLON® MFA also matches equally well with coating layers of PFPE/TEFLON® AF and those of PFPE/TEFLON® SF.

Tube 21 can also be made out of materials like glass, quartzglass, polycarbonate, siliconelastomer, polyethylene, polymethylmeta-crylate or polyurethane.

Thin coating layer 22 can be made out of an amorphous fluoropolymer like TEFLON® AF (TEFLON® AF 1600, TEFLON® AF 1601, TEFLON ® AF2000, TEFLON® AF 2400), TEFLON® SF (all by DuPont), CYTOP® (by Assahi).

Perfluorinated liquids, especially perfluoropolyethers, can be mixed with the solid amorphous fluoropolymers above. The perfluorinated liquid within coating layer 22 can be 0.05 to 3 referenced to TEFLON® AF content by weight. Other materials for layer 22 are modifications of TEFLON® AF like copolymers of two or more components, e.g. PDD (2,2 Bistrifluoromethyl- 4,5-Difluoro-1,3-Dioxol) as a basis with TFE (tetrafluoroethylene), with CTFE (chlorotrifluoroethylene) or with PMVE (perfluoromethylvinylether). These materials can be used for the coating layer 22 in combination with perfluorinated liquids like perfluoropolyethers. When HYFLON® MFA is used as a tube material, layer 22 preferably comprises a TEFLON® AF material, based on the combination of PDD with TFE, with a glass transition temperature $T_g$ less than 180° C., e.g. TEFLON® AF 1600, TEFLON®AF 1601 or TEFLON® AF 1400. It is also possible to use a TEFLON® AF material based on the combination of PDD with CTFE with a $T_g$ between 200 and 240° C. These materials have a higher solubility in the perfluorinated liquids (e.g. FC 75 by 3 M), recommended by DuPont, and therefor allow the production of coating layers with a larger thickness in the range of 5μ which is necessary with tubes of HYFLON® MFA for a one-dip coating procedure.

Coating layer experiments were conducted with a mixture of PFPE and TEFLON® AF. The preferred properties of the liquid PFPE are:

a boiling point above 180° C.
a viscosity (at 20° C.) of 1–2000 cSt
a molecular weight of 600–10000
a surface energy below 28 dyn/cm, preferably below 20 dyn/cm.

The refractive index of PFPE is low (n=1.28–1.30) and matches that of TEFLON® AF. As an amorphous fluoropolymer PFPE consists of C, F and O with the formula:

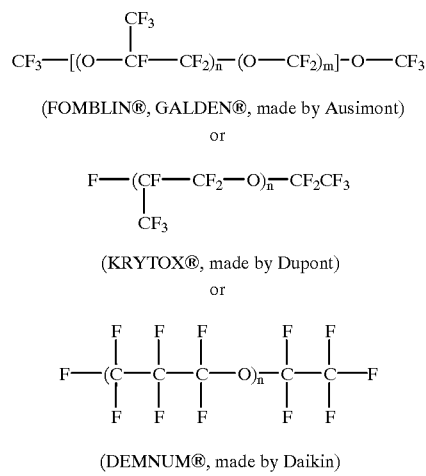

The experiments showed that 4 weight % of solid TEFLON® AF 1600 and 4 weight % of PFPE (perfluoropolyether) in a solution of perfluorinated solvent FC 75 (by 3 M) is completely transparent and shows a viscosity similar to that of a like solution without PFPE. After dip-coating the inner surface of a tube and after evaporation of the solvent FC 75 at elevated temperature the coating layer showed good adhesion to the tube with its thickness increasing in proportion to the PFPE content, thus allowing to create a coating layer with a specific thickness up to a more than double that possible with TEFLON® AF alone, while preserving its excellent optical properties. When using this mixture the negligible cost of PFPE compared to that of TEFLON® AF drops the cost per meter of lightguide by about 50%. The favorable properties of this type of coating layer facilitates the coating of tubes with a diameter below 3 mm and also extend to other non-fluorinated materials like glass, quartzglass etc. In addition the mixed PFPE/AF coated layer shows enhanced elasticity in direct relationship to the proportional PFPE content. Layers made from pure AF are not elastic. The property of elasticity of the coated layer, however, is desirable when tubes made from elastomers like silikon have to be coated internally.

Properties similar to those of TEFLON® AF are displayed by a new material TEFLON® SF, a copolymer of perfluorinated monomers without the presence of PDD and with a lower surface energy of 13 dyn/cm for even better adhesion. Compared to TEFLON® AF it has the disadvantage of having a somewhat higher refractive index in the range of n=1,33. However, applicant found out, that PFPE is soluble in solutions of TEFLON® SF, offered by DuPont (TEFLON® TE=5169A), and that the refractive index of a layer produced by dip coating consisting of PFPE and TEFLON® SF can be reduced to a value below 1,32 and even down to a value of 1,31 by adding about the same amount per weight of PFPE to the TEFLON® SF solution in a weight ratio of one to one compared to the amount of solid TEFLON® SF in the solution.

The layer consisting of PFPE and TEFLON® SF is completely transparent and highly elastic.

The transparent liquid 23 can be a mixture of water ($H_2O$) or heavy water ($D_2O$) or both, or aqueous solutions of $H_2O/D_2O$ with $CaCl_2$ (calcium chloride), with $CaBr_2$ (calcium bromide), with $NaH_2PO_4$ (sodium dihydrogene phosphate), with $K_2HPO_4$ (di-potassium hydrogen phosphate), or aqueous solutions of $H_2O/D_2O$ with di- or triethyleneglycol, or with DMSO (dimethylsulfoxide). The transparent liquid 23 can also comprise PCTFE (polychlorotrifluoroethylene) liquid or phenylmethylsilicon liquid. Aqueous inorganic salt solutions are the preferred realization for the transparent liquid due to their capability for ultraviolet light transmission which has significance for curing epoxies. When the coating layer contains a large amount of the extremely hydrophobic nonpolar PFPE, with a surface energy of 15–20 dyn/cm, it and the aqueous transparent liquid with a high polarity and a high surface energy of 80 dyn/cm provide for a high stability of the lightguide. The process of washing the PFPE liquid out of the coating layer by the aqueous solution, which may be expected after frequent bending of the lightguide in use, is very slow in favor of a long lifetime of the lightguide.

EXAMPLE 1

Liquid lightguide with internally coated tube made out of HYFLON® MFA

A liquid lightguide 16 consisting of a HYFLON® MFA tube 21, with a core diameter of 5 mm, a length of 3000 mm, internally coated with a layer 22 of TEFLON® AF 1400, having a thickness of $5\mu$, and afterwards baked at 150° C. and then filled with a solution of $CaCl_2$ in water with a concentration resulting in a refractive index of n=1,435, sealed on both ends with plugs 24 made from quartz glass, has a transmission as high as 80% at $\lambda$=450 nm, at an aperture angle of 60° for the incident light beam.

This value compares well with a liquid lightguide of identical dimensions and filling liquid, however made out of FEP, internally coated with TEFLON® AF 1600 and baked at 170° C.

EXAMPLE 2

This example compares the optical properties of two liquid lightguides differing only in the material of the internally coated layer and showing the optical equivalences of the more economic material including PFPE to more than 50% by weight:

One liquid lightguide A has a light active core diameter of 5 mm and a total length of 3000 mm. This lightguide consists of a TEFLON® FEP tubing internally coated with a layer of TEFLON® AF 1600, with a thickness of about $3\mu$. The tube is filled with a $CaCl_2/H_2O$ solution with n=1,435. This lightguide has a theoretical value of 72° for the maximum aperture angle. When a focussed light beam is incident on this lightguide with an angle of convergence of 60°, the transmission at $\lambda$=450 nm is 80% and at $\lambda$=362 nm: 76%.

When this lightguide is coiled up with a diameter of 300 mm, the transmission at $\lambda$=450 nm drops only to 78% and at $\lambda$=362 nm to 74%.

A second liquid lightguide B, being identical to the lightguide of a), however, differs on the lightguide in a) by the total reflecting layer consisting of the components PFPE, with an average molecular weight of M=6000 and a viscosity of $\eta$=1500 cSt at 20° C., and TEFLON® AF 1600.

The PFPE oil can be a FOMBLIN® oil from Ausimont with a boiling point of 270° C.

The ratio of the amount of PFPE versus the amount of TEFLON® AF 1600 is 60:40 in percents of weight.

The thickness of the complex layer of the lightguide of b) is also $3\mu$ like in the one of a).

Surprisingly the lightguide B of b) showed the same good transmission values of 80% at $\lambda$=450 nm and 76% at $\lambda$=362 nm compared to lightguide A at identical measurement conditions. Likewise the same little dependence of the transmission on the coiling radius was found when the lightguide of b) was coiled up to a diameter of 300 mm. Since the refractive index of the complex layer PFPE/AF is also 1,31 like that of TEFLON® AF 1600, the numerical aperture angle amounts also to 72°.

Though the reflecting layer of the lightguide B consists essentially of the liquid component PFPE, both lightguides are optically equivalent, also as far as durability is concerned. No deterioration of the optical values of the lightguide of b) has been observed over a period of almost a year.

EXAMPLE 3

MFA tubing coated internally with the complex layer: PFPE/TEFLON® AF 1600.

A tube made of HYFLON® MFA (Ausimont) having the dimensions Ø5×3000 is filled with the aqueous salt solution $CaCl_2/H_2O$, with n=1,435 as in example 1.

Without an internal coating this lightguide has only 16% transmission at $\lambda$=450 nm, and 60° incident core angle of the measuring beam. This value is very low as compared to the values obtained with a cladding tube made out of TEFLON® FEP.

When this MFA tube is internally coated with a layer of TEFLON® AF 1600, having a thickness of $3\mu$, and baked at 170° C., the transmission goes up from 16% to 60%.

However, when the same weight amounts of PFPE and of TEFLON® AF 1600 are added to the coating solution, a thickness of the layer is obtained well above $5\mu$, and the optical transmission is as high as 80%.

By this method, liquid lightguides can be produced, having maximum values for the optical transmission, even when cladding tubes of HYFLON® MFA are used, which so far have a lower optical quality as compared to TEFLON® FEP.

EXAMPLE 4

Adhesion of the complex PFPE/TEFLON® AF layer on substrates made from glass.

The following experiment demonstrates the improved adhesion of the complex layer PFPE/TEFLON® AF on glass substrates.

Two Petri dishes made of glass, with a diameter of 80 mm are filled with equal volumes of two different solutions.

Solution A: AF 1600 dissolved in FC 75 with a concentration of 4% by weight of AF 1600.

Solution B: PFPE and AF 1600 dissolved in FC 75 by weight of 3% and 2% respectively The PFPE oil may either be a FOMBLIN® or a GALDEN® oil from Ausimont, both having a boiling point of 270° C.

After the solvent FC 75 has evaporated within 24 hours both Petri dishes are coated with an even and highly transparent thin layer of a polymer.

Both Petri dishes are then baked at 180° C. for about 10 minutes and slowly cooled down.

When trying to loosen the two polymer layers from their glass substrate, after this procedure one finds that the pure TEFLON® AF 1600 layer can be easily completely loosened after only wetting the layer with water or alcohol. In fact, after a while the layer comes off by itself.

The complex PFPE/TEFLON® AF layer shows a totally different behavior.

When trying to loosen it from the substrate, wetting with liquids shows no effect at all, even after a long time period. It is difficult to loosen the layer and one has to realize that the adhesion of the complex layer to glass is by far superior. This fact may have significance when optical measuring cells, consisting of tubes made from glass, have to be internally coated with a totally reflecting layer, having an extremely low index of refraction. A good adhesion of the layer to the substrate is important, especially when the liquid is flowing.

Furthermore, improved adhesion to a glass surface is important for the application of the complex PFPE/AF material as a totally reflecting layer on the surface of light conducting fibres or rods made from glass.

EXAMPLE 5

Liquid lightguide with a TEFLON ® FEP tube internally coated with a layer made out of TEFLON® SF and PFPE.

A tube made from TEFLON® FEP, with the dimensions Ø5 mm×1500 mm, has been internally coated with a solution having the following composition:

A Dupont Soluble Fluoropolymer (TEFLON® SF) solution with 3% by weight TEFLON® SF solid material dissolved in the perfluorinated liquid PF 5080 (3 M) with the addition of 2.3% by weight PFPE (FOMBLIN® YR 1800 or GALDEN® HT270 from Ausimont).

After the evaporation of the solvent and after baking at 160° C., the FEP tube is internally coated with a completely transparent layer, with a thickness of about $3\mu$, and a refractive index of about 1,31, and showing good adhesion to the FEP substrate.

When a liquid lightguide is made from this internally coated FEP tube by filling it with a $CaCl_2/H_2O$ solution with n=1,435, a theoretical maximum value for the aperture angle of 72° can be achieved.

Surprisingly good is the optical transmission in the blue spectral range at λ=450 nm, showing a value as high as 82%, when a measuring beam with 60° cone angle is used.

The advantages of internally coating FEP tubes with a layer composed of TEFLON® SF and PFPE compare well with the advantages of coating with TEFLON® AF materials, however, the former can be achieved in a much more economic way.

What is claimed is:

1. A liquid lightguide, comprising a tube, closed by transparent plugs at both ends and filled with an optical transparent liquid and coated on its surface with a thin coating layer containing a perfluorinated amorphous fluoropolymer, the coating layer having a refractive index lower than that of the transparent liquid, wherein the coating layer is a mixture of a solid perfluorinated amorphous fluoropolymer and a liquid hydrophobic perfluorinated amorphous fluoropolymer, wherein the weight ratio between the liquid hydrophobic perfluorinated amorphous fluoropolymer and the solid perfluorinated amorphous fluoropolymer is 0.05 to 3.0 and 1, respectively, and wherein the liquid hydrophobic perfluorinated amorphous fluoropolymer remains within the coating layer.

2. The liquid lightguide of claim 1, wherein the solid perfluorinated amorphous fluoropolymer AF is a copolymer of PDD and TFE or a copolymer of PDD with PMVE.

3. The liquid lightguide of claim 1, wherein the solid perfluorinated amorphous fluoropolymer AF is DuPont AF 1400 having a glass transition temperature of 140° C., DuPont AF 1600 having a glass transition temperature of 160° C., DuPont AF 1601 having a glass transition temperature of 160° C., DuPont 2000 having a glass transition temperature of 200° C., DuPont AF 2400 having a glass transition temperature of 240° C. or DuPont SF.

4. The liquid lightguide of claim 1, wherein the thickness of the coating layer varies between 0.5 and 20 $\mu$m.

5. The liquid lightguide of claim 1, wherein the thickness of the coating layer is between 3 and 6 $\mu$m.

6. The liquid lightguide of claim 1, wherein the tube material comprises a fluoropolymer.

7. The liquid lightguide of claim 1, wherein the tube material comprises FEP, PFA, PTFE, ETFE, PCTFE, MFA or THV.

8. The liquid lightguide of claim of claim 1, wherein the transparent liquid is $H_2O/D_2O$, or an aqueous solution comprising $H_2O$ and/or $D_2O$ with $Ca CL_2$, with $Na H_2PO_4$, with $K_2HPO_4$, with $Ca Br_2$, or with di- or triethyleneglycol or with DMSO.

9. The liquid lightguide of claim 1, wherein the hydrophobic amorphous fluoropolymer is a perfluoropolyether.

10. The liquid lightguide of claim 9, wherein the perfluoropolyether consists of the elements C, F and O having formulas

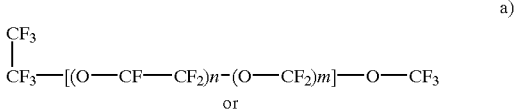

a)

or

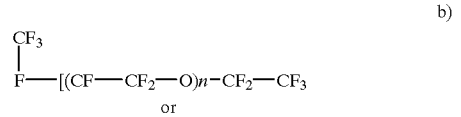

b)

or

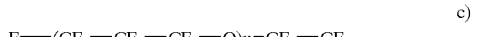

c)

and m and n are an integer.

11. The liquid lightguide of claim 9, whether the coating layer mixture comprises a liquid perfluoropolyether by more than 30% per weight.

12. The liquid lightguide of claim 11, wherein the liquid hydrophobic amorphous fluoropolymer has a boiling point above 180° C. and a viscosity at 20° C. between 1 and 2000 centistokes.

* * * * *